Dec. 5, 1967  S. I. WEISS  3,356,599
METHODS AND APPARATUS FOR MAKING ANNULAR CUTTING WHEELS
Original Filed July 20, 1964

INVENTOR.
SHIRLEY I. WEISS
BY
Philip S. Hilbert

United States Patent Office 3,356,599
Patented Dec. 5, 1967

3,356,599
METHODS AND APPARATUS FOR MAKING ANNULAR CUTTING WHEELS
Shirley I. Weiss, 11 Riverside Drive, New York, N.Y. 10023
Original application July 20, 1964, Ser. No. 383,582. Divided and this application June 10, 1965, Ser. No. 462,945
6 Claims. (Cl. 204—16)

ABSTRACT OF THE DISCLOSURE

Method and apparatus for forming annular cutting blades having abrasive grit bonded to the inner annular edge thereof; the bonded grit having substantial effective radial extent.

---

This application is a division of copending application Ser. No. 383,582, filed July 20, 1964 now Patent No. 3,205,624, dated Sept. 14, 1965.

Annular cutting wheels formed from thin metal blanks with deposits of diamond bort or other abrasive grit on the inner annular edges thereof, have been provided for cutting hard materials such as quartz, germanium, sapphire and the like, where the minimized thickness of the wheel and that of the bort deposit reduces the waste of the cut material derived from the kerf produced by the cutting wheel.

However, with known cutting wheels the amount of bort or grit deposited on the inner annular edge of the wheel is of limited radial extent, which has the effect of limiting the useful life of the cutting wheel.

Accordingly, an object of this invention is to provide improved methods of making cutting wheels having inner annular cutting edges wherein the bort or grit deposit on such cutting edges is of greatly increased radial extent, as compared to that of known cutting wheels, yet maintaining the marginal surface deposits of bort or grit on the wheel which extends from the cutting edge thereof, at a minimum thickness to minimize the kerf produced by the wheels.

Another object of this invention is to provide improved methods of making cutting wheels of the character described wherein the bort deposit on the inner annular cutting edge of the wheel may differ in average grit size from that of the bort deposit on the marginal side surface portions of the wheel extending to said cutting edge whereby to selectively suit the cutting wheel to the material to be cut and to provide desired cut finishes on the material being cut.

A further object of this invention is to provide improved methods of making cutting wheels of the character described, wherein the bort or grit applied to the cutting edge portions thereof is deposited by means of electrolytic metal plating solutions, said solutions being selectively varied to produce metal matrices for the bort of selected hardness and other properties.

Still another object of this invention is to provide an improved method of making annular cutting wheels wherein the marginal surface portions of the inner cutting edge thereof have a metal plating thereon of selected hardness and a deposit of bort or grit only on the inner cutting edge thereof, said metal plating reinforcing the cutting edge portion of the wheel.

Yet another object of this invention is to provide improved methods and apparatus for forming annular cutting wheels including the steps of sequentially depositing bort or grit on selected surface and edge portions of said wheels at the inner cutting edge thereof, whereby to select and control the bort deposits in accordance with properties desired for the particular cutting wheel.

Still another object of this invention is to provide improved methods and apparatus for forming annular cutting wheels wherein diamond bort may be deposited on the inner annular edge thereof to any desired radial depth while maintaining bort deposits on the marginal surface portions at the inner annular edge thereof of minimum thickness or in the absence of deposits on such marginal surface portions thereof.

Other objects of this invention will in part be obvious and in part hereinafter pointed out.

Essentially, the annular cutting wheels of the instant invention comprise thin flat annular metal blanks having diamond bort or other abrasive grit deposited on and adhered to the marginal surface portions at the inner annular edge thereof, as well as such bort or grit further deposited on the inner annular edge where the last mentioned deposit may have any desired radial extent so as to very substantially increase the useful life of the cutting wheel.

Also, cutting wheels made in accordance with the instant invention may have the bort deposit on the marginal surface portions at the inner annular edge thereof of a grit size and a metallic grit adhering matrix which differ from the grit size and the grit adhering matrix of the bort deposit on the inner annular edge of the wheel.

Figure 1:
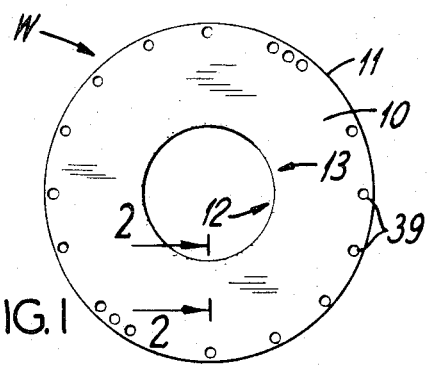
FIG. 1 is a front elevational view of an annular cutting wheel embodying the invention.

Thus, as shown in FIG. 1, a cutting wheel embodying the invention is generally designated at W. Wheel W is formed from a thin flat metallic blank 10 which may be of copper, Phosphor bronze, beryllium copper, stainless steel or other suitable metal or alloy. Wheel W is in annular form with an outer edge 11 and an inner cutting edge generally designated at 12. Diamond bort or other abrasive grit is adhered to cutting edge 12 and is generally designated at 13.

It is understood that blank 10 is of minimum thickness which may be of the order of about .001 to .004″, yet may be .010″. As cutting wheel W is to be used in cutting expensive hard materials such as quartz, germanium, sapphire and the like, the kerf produced by the cutting wheel should be of minimum dimension. Accordingly, diamond bort is applied to the marginal surface portions 14, 15 of blank 10 with a thickness of such bort deposit limited to the order of about not more than about .003″ and as little as .001″, such deposits being indicated at 16, FIG. 2. The bort deposits 16 also extend about edge 17 of blank 10 to provide an edge deposit portion 18.

The bort deposits 16, 18 are preferably derived from metal salt electroplating solutions carrying a suspension of diamond bort of selected mesh size; the bort being held in a matrix of electrodeposited metal which may be selected on the basis of hardness, lubricating values or other properties pertinent to the material to be cut and the cutting operation. Thus, the metallic matrix typically may be of nickel in which case the electroplating solution is made up of nickel salts all in a manner known in the art.

Thereafter, blank 10 has a further deposit of diamond bort of selected mesh size, applied to edge bort deposit portion 18, as at 19. The edge deposit 19 of bort is also derived from an electroplating solution which provides a metallic matrix for the bort. The edge deposit 19 may have a radial dimension of .008″ or more. The resultant cutting wheel W through the extended edge deposit 19 of bort will have a useful life which far exceeds that of conventional wheels where the edge bort deposit is of very small radial extent.

It is understood that the sequential application of bort deposits on blank 10, as described above, permits great selectivity of the bort size in deposits 16 and 19, as well as selection of the metal matrix which bonds the bort to the metal surfaces and edges of the cutting wheels.

Thus, in wheel W, the bort size for the deposit 16 may be in the finer mesh sizes so as to minimize the kerf and further, to provide a desired finish on the cut surfaces of the material being processed; while bort size of deposit 19 may be in the coarser mesh sizes so as to provide optimum cutting. The metal matrix for deposit 16 may be harder than that of the edge deposit 19; using a hard nickel for the former and a soft nickel for the latter. It is understood that the electroplating solutions including the selected metal salts and combinations thereof may be formulated in a known manner to produce matrices of selected hardness. Also, the matrix may be so selected as to have lubricating properties, as when using the softer metals such as lead, tin and bismuth.

In an alternative form of the invention, a cutting wheel W' is made by processing metal blank 10 to provide on the marginal surface portions 14, 15 extending from the inner annular edge 17, metallic coatings 20 which are devoid of any bort and then depositing on edge portion 20A of said metallic coating bort as at 21. Edge deposit 21 may have a selected radial extent as described above. It has been found that the metal coatings 20 provide a reinforcement for the cutting edge portions of the wheel so as to prevent deterioration of the bort deposit despite the tensioning forces applied to the cutting wheel when the same is mounted on holders, in a manner known in the art. The metal coatings 20 have a hardness greater than that of metal blank 10, and may be derived from nickel, nickel-cobalt, chromium, or other suitable metals or metal alloys.

Figure 5:
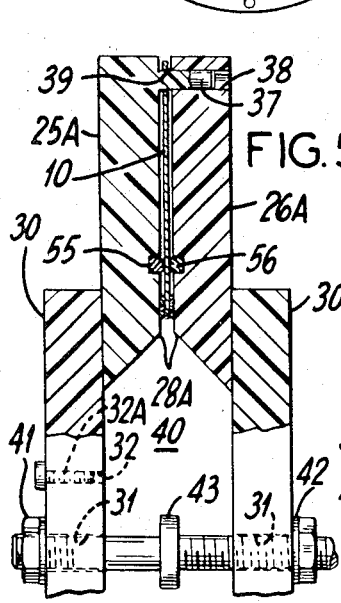
FIG. 5 is a sectional view similar to that of FIG. 4 and showing apparatus for carrying out the final stage of the method embodying the invention.
Figure 4:
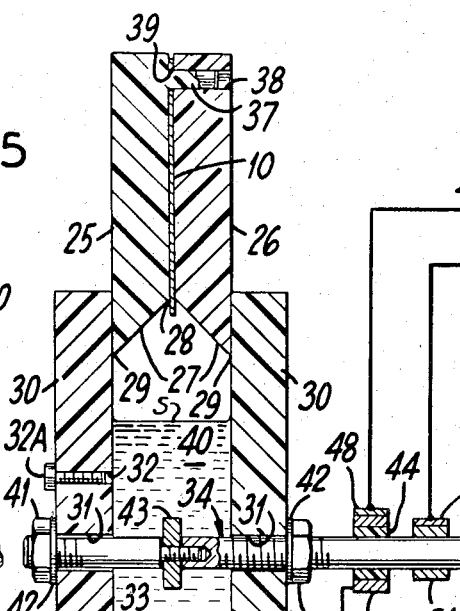
FIG. 4 is a sectional view of an apparatus for carrying out an initial stage of the method embodying the invention.
Figure 4:
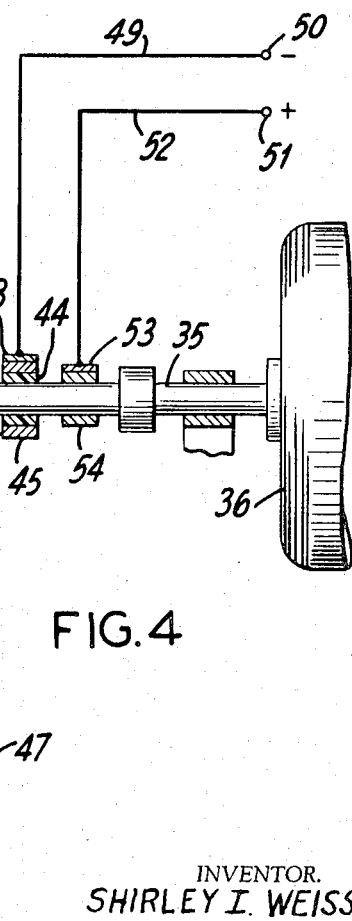

The novel cutting wheels described above are formed in the manner illustrated in FIGS. 4, 5. Thus, the flat metal blank 10 is assembled with masking members in the form of annular plastic discs 25, 26 which may be formed of methyl methacrylate or other corrosion resistant plastic. Discs 25, 26 are formed with bevelled inner edges 27 to provide a large opening 28 on one side and a small opening 29 on the other side. Circular closure discs 30, also of plastic and having a diameter somewhat greater than that of openings 29, are centrally located on discs 25, 26 and adhered thereto so as to close openings 29 therein. Closure discs 30 are formed with axially aligned shaft openings 31; together with a filling opening 32 and a vent opening 33 in one of discs 30, for the purpose later described.

The masking member 25, 26 together with the interposed metal blank 10 are mounted on a shaft portion 34 which is coupled to a motor shaft 35 extending from a motor 36. Masking member 25 is provided with laterally projecting locating pins 37 while member 26 is formed with complementary recesses 38 to receive the projecting ends of pins 37 which pass through the usual openings 39 in blank 10 by which the finished cutting wheel is mounted on a holder, not shown. The diameter of openings 28 in masking members 25, 26 is slightly greater than the I. D. of blank 10, whereby with blank 10 interposed between masking members 25, 26, the marginal surface portions 14, 15 and edge 17 of said blank is left unmasked, FIG. 4, and the same project into a chamber 40 formed by members 25, 26 and closure discs 30.

The masking members 25, 26 are held in clamped relation to interposed blank 10 by nuts 41, 41 abutting the outer surfaces of closure discs 30; said nuts 41 being threaded on threaded portions of shaft portion 34, together with gaskets 42 on said shaft portion to prevent leakage through openings 31 in discs 30.

With metal blank 10 masked and arranged on shaft portion 34, the selected electroplating solution which has suspended therein the diamond bort of a selected mesh range is introduced into chamber 40 by way of filling opening 32, to a selected level within said chamber, venting opening 33 facilitating the chamber filling operation. Nylon screws 32A, 33A close openings 32, 33 which are suitably threaded to receive the same.

The deposit of the suspended bort from solution S within chamber 40 on the unmasked portions of blank 10 takes place by electrophoretic action, wherein the blank 10 constitutes the cathode and an anode is provided in the form of a washer 43 mounted on shaft portion 34 in alignment with the inner exposed edge 17 of said blank. Washer 43 is of a metal corresponding to the metallic salts of solution S. Shaft portion 34 may be made up of a pair of longitudinally interconnectable portions which may be disassembled to allow for assembly therewith of a selected anode washer 43.

Current is supplied to anode 43 and cathode 10 by suitable commutator means mounted on shaft portion 34. The same includes an insulating sleeve 44 fixed to shaft portion 34, which carries a conductive metal sleeve 45 thereon for rotation therewith. A connector clip 46 is arranged to be clamped in contact with an outer peripheral portion of blank 10 and a wire 47 connects clip 46 with commutator sleeve 45. A contact finger 48 is arranged to bear on the commutator sleeve 45 while the same rotates and a wire 49 connects finger 48 to the negative terminal 50. The positive terminal 51 is connected by a wire 52 to a finger contact 53 arranged to bear on a conductive commutator sleeve 54 directly mounted on shaft portion 34.

While motor 36 rotates shaft 35 at a desired low speed such that the horizontal level of solution S as shown in FIGURE 4 is not substantially disturbed a direct current of calculated ampere density is applied to terminals 50, 51 whereby bort deposits 16, 18 are produced on the inner annular edge of blank 10. The extent, density and other characteristics of such deposits may be controlled by regulation of the speed of motor 36, the current density, as well as the nature of plating solution S.

When deposits 16 and 18 have been made on blank 10, the operation as shown in FIG. 4 is stopped and blank 10 disassembled from the masking members. The blank 10 is then reassembled with masking members somewhat similar to that of members 25, 26 except as hereinafter noted. Thus, masking members 25A, 26A are similar to members 25, 26 except that openings 28A thereof are somewhat smaller in diameter which has the effect of locating the inner annular edge 17 of blank 10 and its bort deposit 18 thereon, inwardly of said openings 28A. This effectively masks the side bort deposits 16 on blank 10 by the clamping action of the opposed surfaces of masking members 25A, 26A, yet leaving the edge 17 and its deposit 18 open for communication with chamber 40.

The assembly of blank 10 and masking members 25A, 26A is mounted on shaft portion 34 as previously described and chamber 40 is supplied with a requisite amount of plating solution S and suspended bort, where such solution may differ from that previously used, so as to obtain a metal matrix of different hardness or other selected properties. Also, the bort size may be different from that used in making the initial deposits 16, 19. The motor 36 is again operated to rotate the assembly at selected speed and current of appropriate density is applied at terminals 50, 51 to produce a bort deposit 19 of desired radial extent.

To insure against leakage of solution S from chamber 40, masking members 25A, 26A may be grooved on their facing surfaces as at 55 to receive O rings 56 therein which bear against metal blank 10 on either side thereof.

Figure 2:
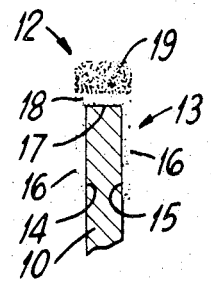
FIG. 2 is an enlarged transverse sectional view taken on the line 2—2 of FIG. 1.
Figure 3:
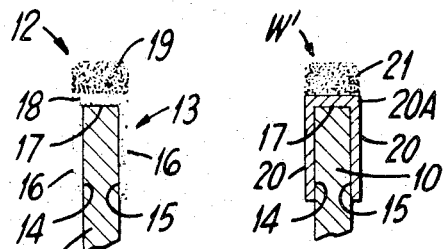
FIG. 3 is a sectional view similar to that of FIG. 2, showing a modified form of the invention.
Figure 6:
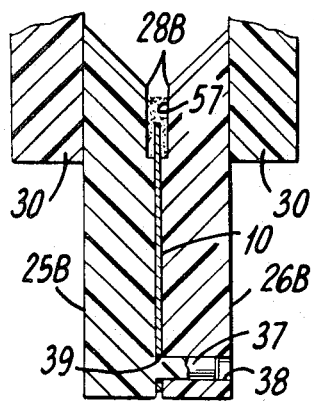
FIG. 6 is a partial sectional view showing a modified form of said apparatus.

Alternatively, as shown in FIG. 6, the cutting wheels W, as shown in FIG. 2 may be formed by a single operation, by the use of special masking members 25B, 26B. Such members are formed with an annular rabbet 57 extending inwardly from the openings 28B thereof. Thus, when the original blank 10 is clamped between masking members 25B, 26B, the marginal surface portions 14, 15 and edge 17 are not only exposed to receive bort depositions, but the depth of rabbets 57 limits the thickness of deposits 16 while allowing the edge deposit 19 to be extended radially as desired.

As various changes might be made in the embodiments of the invention herein disclosed without departing from the spirit thereof, it is understood that all matter herein shown or described shall be deemed illustrative and not limiting except as set forth in the appended claims.

What is claimed is:

1. The method of forming an annular cutting wheel comprising providing a thin flat annular metal member, masking the opposite sides of said member to expose limited marginal surface portions extending from the inner annular edge thereof and said inner annular edge, electrodepositing abrasive grit in an electroplated metal matrix on said exposed marginal surface portions and the inner annular edge of said member, masking the entire surface portions on either side of said member and the grit deposit on the marginal surface portions thereof while exposing the inner annular edge of said member and the grit deposit thereon, and electrodepositing additional abrasive grit on said last mentioned exposed grit deposit to provide a total grit deposit on the inner annular edge of said member having a radial extent equal to a substantial multiple of the thickness of the grit deposit on the opposite marginal surface portions of said member.

2. The method of forming a cutting wheel comprising providing a thin flat annular member, clamping said annular member between a pair of annular masking members to expose marginal surface portions at the inner annular edge of said flat annular member and the inner annular edge thereof, closing the open sides of said masking members to provide an enclosed circular chamber with the exposed marginal surface portions and the inner annular edge of said flat member projecting radially into said chamber, arranging said assembly of flat member, and masking members for rotation about the axis thereof, providing anode means within said chamber and at the axis thereof, providing a metal plating solution containing abrasive grit suspended therein within said chamber, rotating said assembly while applying a plating current to said anode and said flat metal member whereby to deposit abrasive grit and metal matrix material on the exposed marginal surface portions and the inner annular edge of said flat metal member.

3. The method as in claim 2 wherein said flat metal member is disassembled from said masking members and reassembled with a second pair of annular masking members for exposing only the inner annular edge of said flat metal member and the grit deposit thereon, closing the open sides of said second pair of masking members to provide an enclosed circular chamber, providing a metal plating solution containing abrasive grit suspended therein, rotating said assembly while applying plating current to said anode and said flat metal member to deposit additional abrasive grit on the initial deposit of grit on the inner annular edge of said flat metal member.

4. The method of forming a cutting wheel comprising providing a thin flat annular metal member, masking the opposite side surfaces of said member to leave exposed the inner annular edge and the marginal surface portions extending from said inner annular edge, electrodepositing abrasive grit on said marginal surface portions of said member until said electrodeposit attains a predetermined, limited thickness and electrodepositing additional abrasive grit on said inner annular edge of said member until said last mentioned electrodeposit attains a radial extent which is a substantial multiple of said limited thickness of said first mentioned electrodeposit.

5. Apparatus for forming cutting wheels from a thin, flat annular metal blank comprising means for masking the opposite sides of said blank while exposing the inner annular edge thereof and limited marginal surface portions extending from said inner annular edge thereof, means on said masking means for forming an axially disposed electroplating chamber for containing a suspension of abrasive grit in electroplating solution with the exposed edge and marginal surface portions of said blank projecting radially into said chamber, anode means within said chamber, means for rotating said assembly of blank, masking means, chamber forming means and anode about a horizontal axis, and means for applying an electric current to said anode means and said blank while said assembly is rotating to electrodeposit abrasive grit from said suspension on the exposed edge and marginal surface portions of said blank.

6. Apparatus as in claim 5 wherein said masking means comprises a pair of annular plates and means for clamping said blank between said pair of plates, and said chamber forming means comprising a pair of discs respectively mounted on the outer surfaces of said annular plates and closing the openings therein, said rotating means comprising a motor and motor shaft, said shaft extending axially through said closure discs, said anode means being mounted on said shaft in alignment with the inner annular edge of said blank.

References Cited

UNITED STATES PATENTS

| 2,360,798 | 10/1944 | Seligman et al. | 204—16 |
| 2,370,970 | 3/1945 | Keeleric | 204—16 |
| 2,784,536 | 3/1957 | Barron | 125—21 |
| 2,858,256 | 10/1958 | Fahnoe et al. | 204—181 |
| 3,281,996 | 11/1966 | Cuklanz | 204—16 |

JOHN H. MACK, *Primary Examiner.*

T. TUFARIELLO, *Assistant Examiner.*